United States Patent [19]

Ito

[11] Patent Number: 4,836,660
[45] Date of Patent: Jun. 6, 1989

[54] ZOOM LENS SYSTEM FOR COMPACT CAMERA

[75] Inventor: Takayuki Ito, Tokyo, Japan

[73] Assignee: Asahi Kogaku Kogyo Kabushiki Kaisha, Tokyo, Japan

[21] Appl. No.: 135,417

[22] Filed: Dec. 21, 1987

[30] Foreign Application Priority Data

Dec. 19, 1986 [JP] Japan ................................ 61-302921

[51] Int. Cl.[4] .......................... G02B 15/14; G02B 9/62
[52] U.S. Cl. ..................................... 350/423; 350/426
[58] Field of Search ......................................... 350/423

[56] References Cited

U.S. PATENT DOCUMENTS 4,720,179  1/1988  Ito ....................................... 350/426

Primary Examiner—John K. Corbin
Assistant Examiner—Rebecca D. Gass
Attorney, Agent, or Firm—Sughrue, Mion, Zinn, Macpeak and Seas

[57] ABSTRACT

A zoom lens for a compact camera having a small degree of constraint on back focus and which can be manufactured at a low cost. The inventive lens system is divided into a first lens group having a positive focal length and a second lens group having a negative focal length, zooming being achieved by varying the distance between the first and second groups. The first group is composed of a front lens unit having a nagative focal length inclusive of at least one positive lens element and at least one negative lens element, a rear lens unit having a positive focal length positioned on the image side of the front lens unit and which includes at least one negative lens element and at least one positive lens element, and a middle lens unit positioned between the front and rear lens units and which includes at least one positive lens element having a convex surface directed toward the image side.

6 Claims, 4 Drawing Sheets

ZOOM LENS SYSTEM FOR COMPACT CAMERA

BACKGROUND OF THE INVENTION

The present invention relates to a zoom lens system that is suitable for use with a compact camera and having a small degree of constraint on back focus.

The following three types of zoom lens system have heretofore been proposed for use with compact cameras. The first type is a telephoto zoom lens composed of two lens groups, the first group having a positive focal length and having a stop diaphragm and the second lens group having a negative focal length. (Examples of lenses of this first type are shown in Unexamined Published Japanese Patent Applications Nos. 128911/1981 and 201213/1982, together corresponding to U.S. Pat. No. 4,682,860, Japanese Patent Application Nos. 48009/1985 and 170816/1985, and Japanese Application No. 191216/1985, corresponding to U.S. Pat. No. 4,659,186. The second type, which is a modification of the first type, is composed of three lens groups. The first group has a positive focal length and it has a stop diaphragm. The second lens group also has a positive focal length, while the third lens group has a negative focal length. (An example of this second type is Unexamined Published Japanese Patent Application No. 184916/1983). The third is composed of four lens groups, the first group having a positive focal length, the second group having a negative focal length, the third group having a positive focal length and the fourth group having a negative focal length (An example of this third type is illustrated in Unexamined Published Japanese Patent Application No. 57814/1985 corresponding to U.S. Pat. No. 4,701,033).

However, these three types of conventional zoom lens systems, while adapted for use with compact cameras, have certain problems, as described below. The first type which is composed of two lens groups has a very simple lens configuration, but the first and second lens groups must be moved by large amounts for zooming. The second type is a modification of the first type in that the first lens group is divided into two groups, each having a positive focal length. In this lens too the amount by which each of the lens groups must be moved for zooming is no smaller than in the first type. The third type, which is composed of four lens groups, has the advantage that the individual lens groups need to be displaced by smaller amounts than in the first and second types. However, this type of lens system is difficult to manufacture for two reasons. First, the overall lens arrangement is complex. Secondly, the four lens groups, particularly the second and third lens groups, have such great powers that small manufacturing differences can cause substantial adverse effects on the performance of the final product.

In practical applications, the zoom lens system of all three types have one common problem in that, since they are intended for use with compact cameras, their design does not include any constraint on back focus. In an extreme case, the back focus may be as small as about 1 mm. The absence of any constraint on back focus is advantageous for the purpose of reducing the overall length of the system but, on the other hand, the lens diameter of the rear group is increased and the overall size of the camera, including the mechanisms used for zooming, auto-focusing and the like, will be by no means be smaller than when certain constrains on back focus exist. Another problem associated with the absence of any constraint on back focus is an increase in the possibility of internal reflections between the film surface and the surfaces of lenses in the rear group.

In order to solve these problems of the prior art zoom lens systems for use with compact cameras, the applicant of the present application previously accomplished the invention described in Japanese Patent Application No. 232459/1985. In the embodiments described in the specification of that application, the system is capable of attaining zoom ratios of the order of 1.6. However, there is still room for improvement, namely, in the satisfaction of the demand for a zoom lens having an even greater zoom ratio. With a view to satisfying this need, the applicant later proposed in Japanese Patent Application No. 268473/1985 a lens system capable of attaining a zoom ratio exceeding 1.7. However, it is desired to provide a zoom lens system which requires fewer lens elements than the lens system of this application.

SUMMARY OF THE INVENTION

The present invention is an improvement of the system described in Japanese Patent Application No. 268473/1985.

A specific object of the present invention is to provide a zoom lens system suitable for use with a compact camera that is composed of two lens groups, as in the previously described conventional first type of zoom lens system, and which has a reduced overall length, even though the back focus is made longer than a certain value in order to reduce the lens diameter of the rear group. The zoom lens system of the present invention achieves a zoom ratio of 1.7 or more while employing a two-unit two-element configuration for the second lens group. That is, the number of lens components in the second group is reduced by one as compared with the conventional first type while yet providing effective compensation of aberrations such as coma and distortion.

More specifically, the inventive lens system is divided into a first lens group having a positive focal length and a second lens group having a negative focal length, zooming being achieved by varying the distance between the first and second groups. The first group is composed of a front lens unit having a negative focal length inclusive of at least one positive lens element and at least one negative lens element, a rear lens unit having a positive focal length positioned on the image side of the front lens unit and which includes at least one negative lens element and at least one positive lens element, and a middle lens unit positioned between the front and rear lens units and which includes at least one positive lens element having a convex surface directed toward the image side. The lens system satisfies:

(1) $1.35 < f_s/f_1 < 1.7$;
(2) $1.69 < N_{1an}$;
(3) $34 < \nu_{1an}$;
(4) $-2.0 < f_s/f_{1bn} < -0.7$;
(5) $9 < \nu_{1bp} - \nu_{1bn}$;
(6) $0.23 < f_{Bs}/f_s < 0.5$;
(7) $-1.5 < r_6/f_s < -0.4$; and
(8) $-0.2 < f_s/f_{1am} < 0.2$ where
$f_s$: focal length of the overall lens system at the wide angle position;
$f_1$: focal length of the first lens group;
$N_{1an}$: refractive index at the d line of the negative lens element in the front lens unit;

$\nu_{1an}$: Abbe number of the negative lens element in the front lens unit;

$f_{1bn}$: focal length of the negative lens element in the rear lens unit;

$\nu_{1bp}$: Abbe number of the positive lens element in the rear lens unit;

$\nu_{1bn}$: Abbe number of the negative lens element in the rear lens unit;

$f_{BS}$: back focus at the wide angle position;

$r_6$: radius of curvature of the surface on the image side of the middle lens unit; and $f_{1am}$: composite focal length of the combination of the front to middle lens units.

DESCRIPTION OF THE PREFERRED EMBODIMENTS

Figure 1:
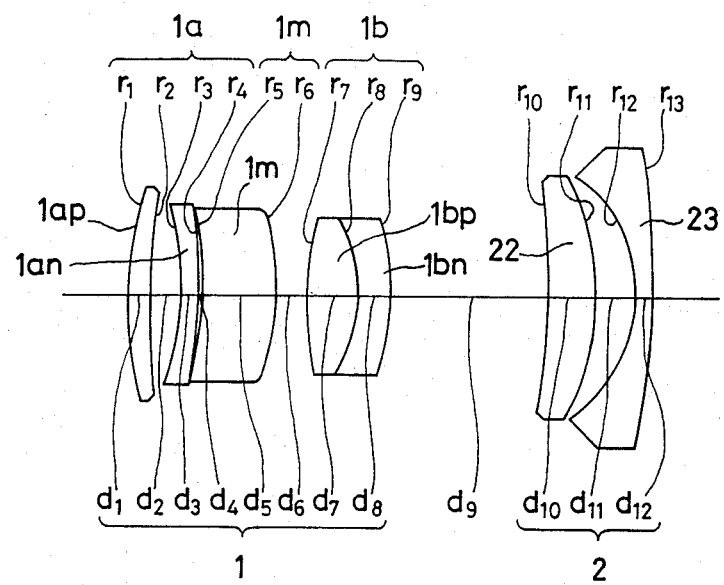
FIGS. 1 and 3 are simplified cross-sectional views of zoom lens systems according to Examples 1 and 2 of the invention described in the present specification at the wide angle position.
Figure 2A:
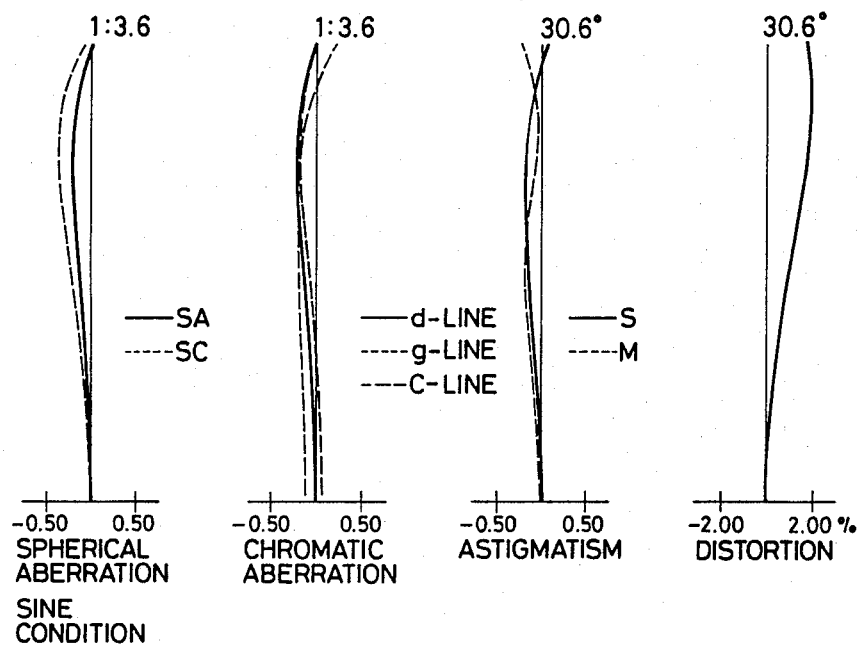
FIGS. 2A, 2B and 2C are graphs showing aberrational curves obtained at wide angle, middle angle and narrow angle positions, respectively, of the zoom lens system constructed according to Example 1.
Figure 2B:
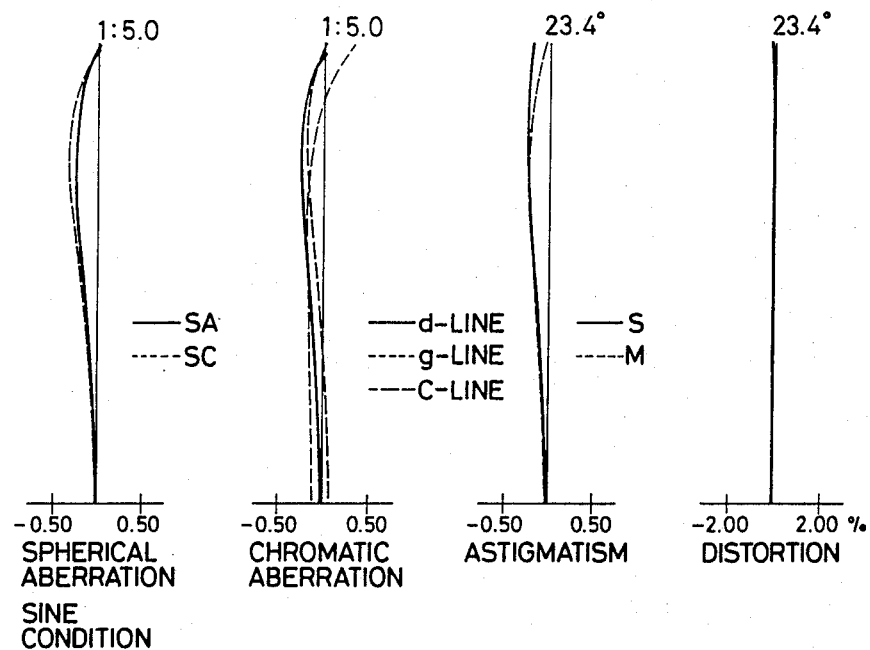
Figure 2C:
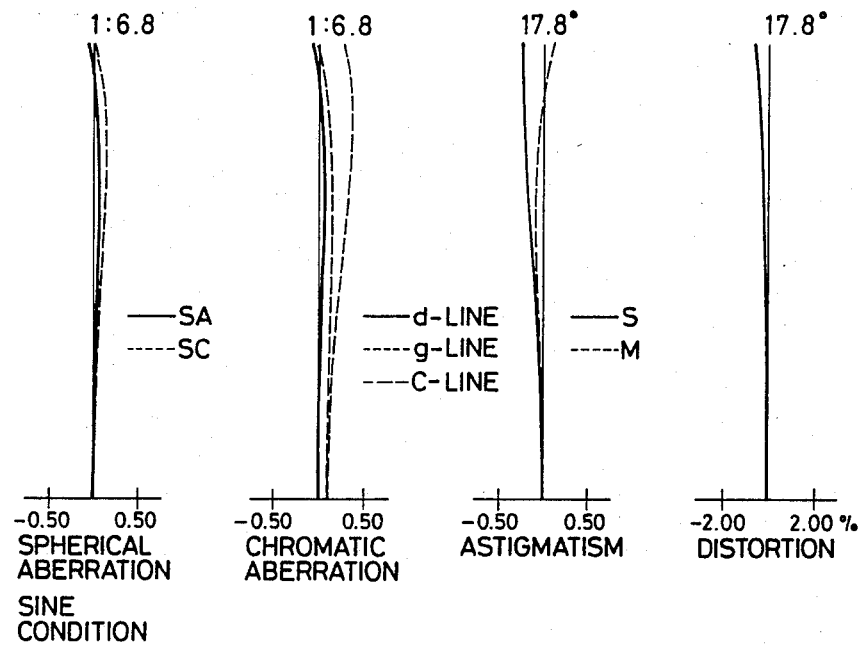
Figure 3:
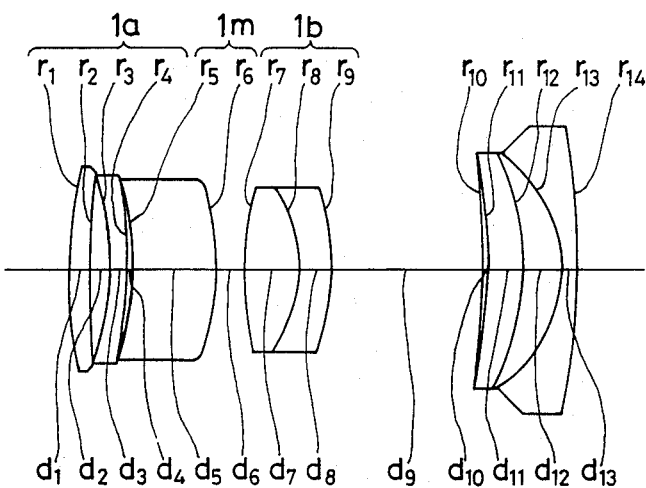
Figure 4A:
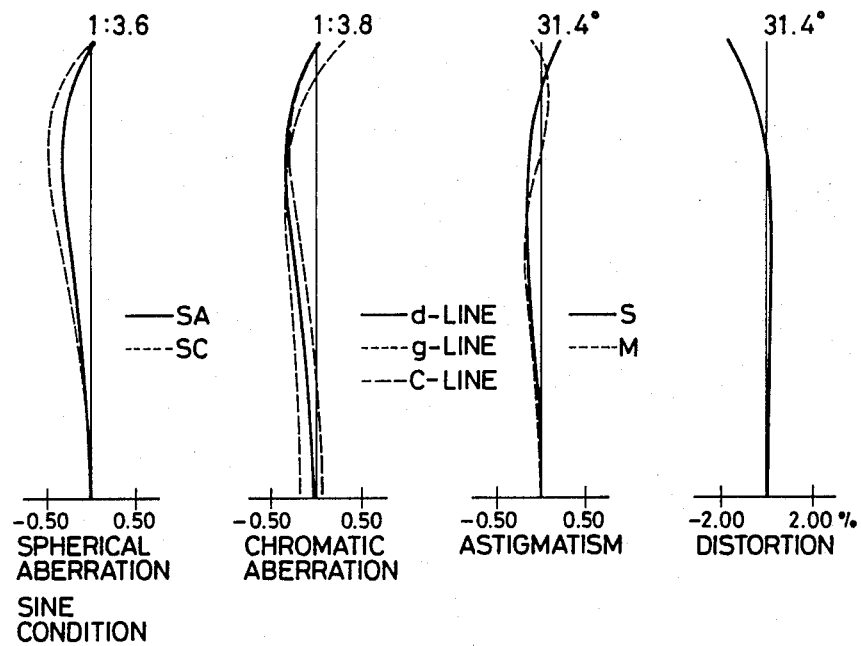
FIGS. 4A, 4B and 4C are graphs showing aberrational curves obtained at wide angle, middle angle and narrow angle positions, respectively, of the zoom lens system constructed according to Example 2.
Figure 4B:
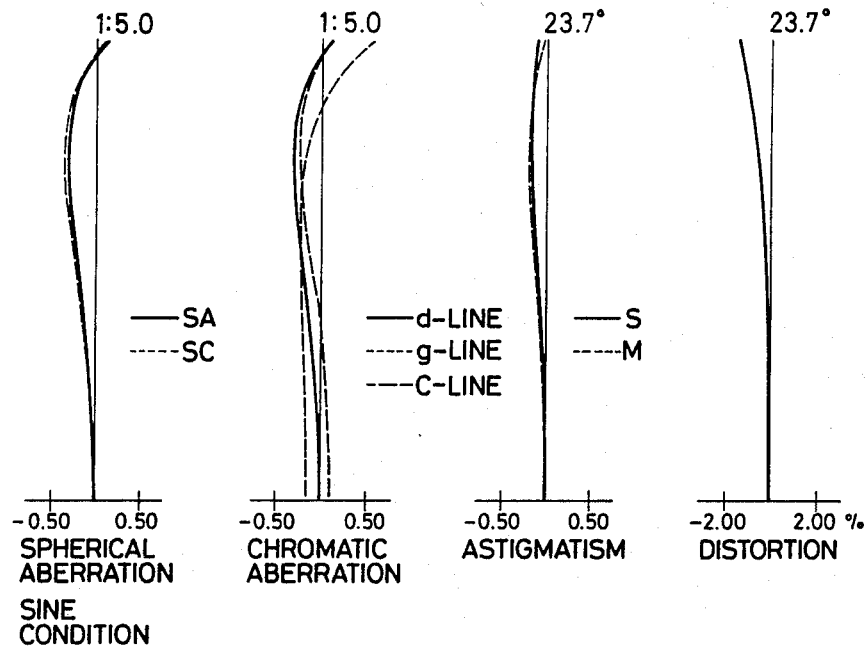
Figure 4C:
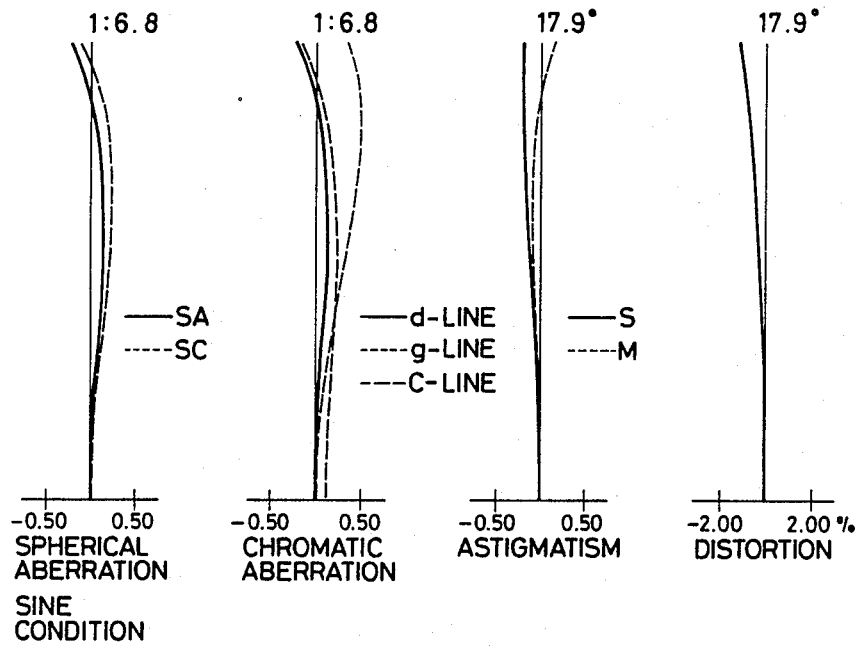

As shown in FIGS. 1 and 3, a preferred embodiment of a zoom lens system of the present invention for use with a compact camera is composed, in order from the object side, of a first lens group 1 having a positive focal length and a second lens group 2 having a negative focal length. Zooming is achieved by changing the distance between the first and second lens groups 1 and 2. The first lens group 1 includes: a lens unit 1a having a negative focal length, which is positioned on the object side, and which has at least one positive lens element 1ap and at least one negative lens element 1an, and a lens unit 1b having a positive focal length which is positioned on the image side and which has at least one negative lens element 1bn, and at least one positive lens element 1bp, and a lens unit 1m is positioned between the lens unit 1a and 1b and which is composed of at least one positive lens element 1mp having its convex surface directed toward the image side. The lens system satisfies the following conditions:

(1) $1.35 < f_s/f_1 < 1.7$;
(2) $1.69 < N_{1an}$;
(3) $34 < \nu_{1an}$;
(4) $-2.0 < f_s/f_{1bn} < -0.7$;
(5) $9 < \nu_{1bp} - \nu_{1bn}$;
(6) $0.23 < f_{Bs}/f_s < 0.5$;
(7) $-1.5 < r_6/f_s < -0.4$; and
(8) $-0.2 < f_s/f_{1am} < 0.2$ where $f_s$: the focal length of the overall lens system at the wide angle position;

$f_1$: the focal length of the first lens group;

$N_{1an}$: the refractive index at the d line of the negative lens element in the front lens unit 1a;

$\nu_{1an}$: the Abbe number of the negative lens element in the front lens unit 1a;

$f_{1bn}$: the focal length of said negative lens element in the rear lens unit 1b;

$\nu_{1bp}$: the Abbe number of the positive lens element in the rear lens unit 1b;

$\nu_{1bn}$: the Abbe number of the negative lens element in the lens unit 1b;

$f_{BS}$: the back focus at the wide angle position;

$r_6$: the radius of curvature of the surface on the image side of the middle lens unit 1m; and $f_{1am}$: the composite focal length of the combination of the lens units 1a and 1m.

The second lens group 2 which has a negative focal length is of a two-unit two-element configuration which is composed of, in order from the object side, a positive meniscus lens element 22 having a convex surface with a large curvature on the image side and a negative meniscus lens element 23 having a concave surface with a large curvature on the object side. The second lens group 2 has asphericity in at least one surface and satisfies the following condition:

(9) $1.7 < N_{2n}$ where $N_{2n}$: refractive index at the d line of the negative lens element in the second lens group.

In a preferred embodiment, the lens unit 1a having a negative focal length is composed of, in order from the object side, a positive lens element 1ap having a convex surface with a large curvature on the object side, and a negative lens element 1an having a concave surface with a large curvature on the object side. The lens unit 1b which has a positive focal length includes, in order from the object side, a biconvex positive lens 1bp element cemented to a negative meniscus lens element 1bn which has its concave surface directed toward the object side. The positive lens unit 1m is composed of a positive lens element having its convex surface directed toward the image side.

In Example 1 described below the aspherical surface in the second lens group 2 having a negative focal length is provided on the object side of the positive meniscus lens element in the second lens group. In Example 2, also to be described below, asphericity is produced by applying a very thin film to a lens element in the second lens group.

As for the first lens group, the present invention employs substantially the same configuration as that described in Japanese Patent Application No. 268473/1985. The present invention has an object providing a back focus that is longer than a certain value and yet reducing the overall length of the lens arrangement while achieving satisfactory performance overall. In order to attain these objects, unconventional optical material is selected for the lens unit 1a in the first lens group 1. In addition, the lens unit 1b in the first lens group 1, which is conventionally composed of either a single positive lens element alone or two or three positive lens elements, is formed by at least one negative lens element 1bn and at least one positive lens element 1bp.

Condition (1) relates to the requirement that has to be met by the power of the first lens group 1. In accordance with the present invention, the lens unit 1m having a positive focal length is disposed between the two lens units 1a and 1b. This additional lens unit 1m allows the first lens group 1 to provide a greater power without increasing the aberrational variations that may take place during zooming. If the upper limit of condition (1) is exceeded, favorable conditions for attaining a compact lens system are achieved but, on the other hand, the power of the first lens group 1 becomes too great to inhibit an unwanted increase in the spherical and coma aberration during zooming. If the lower limit of condition (1) is not reached, favorable conditions for achieving effective corrections of aberrations are provided. However, the change in the focal length of the overall system relative to the change in the distance between the first and second lens groups 1 and 2 is reduced and, as in the case of the prior art system, the amounts by which the first and second lens groups 1 and 2 have to be displaced during zooming are significantly increased, rendering it impossible to provide a compact zoom lens system capable of attaining a zoom ratio of 1.7 or more.

Condition (2) and (3) set forth the requirements that have to be satisfied by the negative lens element or elements $1an$ in the lens unit $1a$. If condition (2) is not met, the $1an$ chance of excessive field curvature occurring at the wide angle position is increased, and a specific problem results in that excessive astigmatism occurs in the sagittal direction at the maximum viewing angle.

Condition (3) as well as condition (2) place a constraint on the scope of optical materials which can be used for the negative lens element $1an$ or the elements in the lens unit $1a$. Common practice in the art has dictated that the negative lens elements in a lens group having a positive focal length should be made of an optical material based on dense flint glass (SF) (that does not satisfy condition (3)). However, this material is not suited to the purpose of providing a sufficiently large back focus (which satisfies condition (6)) while reducing the overall length of the lens arrangement because any chromatic aberration that occurs is undercompensated at the wide angle position and overcompensated at the narrow angle position. Condition (3) is important in that effective compensation of chromatic aberration can be achieved at both angle positions by achieving a compromise between this condition and both of conditions (4) and (5) (described below).

Conditions (4) and (5) concern the requirements that have to be met by the lens unit $1b$. As already mentioned, the lens unit $1b$ in the prior art system of the two-group type is composed solely of either a single positive lens element or two or three positive lens elements. In accordance with the present invention, however, the lens unit $1b$ is composed of at least one negative lens element $1bn$ and at least one positive lens element $1bp$ in order to provide a sufficiently large back focus while reducing the overall length of the lens system. In addition, the unit $1b$ is required to satisfy both conditions (4) and (5), which is done by properly selecting the power and the optical material.

If the power limit of condition (4) is not reached, the power of the negative lens element $1bn$ or elements in the lens unit $1b$ becomes too great to avoid overcompensation of chromatic aberration. If the upper limit of condition (4) is exceeded, the power of the negative lens element $1bn$ or elements in the lens unit $1b$ becomes too small to achieve effective compensation of chromatic aberration. If condition (5) is not met, the balance with condition (3), which is necessary for achieving effective compensation of chromatic aberration, is upset.

Condition (6) relates to the constraint placed on the back focus in order to provide a compact camera, including the lens system and other necessary mechanisms such as those used in zooming and auto-focusing. If the lower limit of condition (6) is not reached, favorable conditions for reducing the overall length of the lens arrangement are provided. However, the diameter of the rear group (second lens group) is increased to such an extent that the resulting camera can by no means be made compact. If the upper limit of condition (6) is exceeded, favorable conditions for the purpose of reducing the diameter of the rear group are provided, but, on the other hand, the overall length of the lens system is increased, precluding the possibility of providing a compact camera.

Conditions (7) and (8) specify the requirements that have to be satisfied by the lens unit $1m$. The unit $1m$ is composed of at least one positive lens element $1mp$ which has a convex surface directed toward the image side. In accordance with the present invention, balance is struck between the two lens units $1m$ and $1a$ so that the power of the first lens group 1 can be increased without sacrificing effective compensation of the coma aberration. If the upper limit of condition (7) is exceeded, the power of the lens unit $1m$ becomes so great that overcompensation of coma in the lens unit $1a$ is unavoidable. If the lower limit of condition (7) is not reached, undercompensation occurs, upsetting the balance between the individual lens units in the first lens group 1.

If the power of the lens unit $1m$ is adjusted to be included within the lower and limits of condition (8), the front lens group (i.e., the combination of lens unit $1a$ to $1m$) becomes essentially afocal, offering the advantage that an offset introduced in the front group by manufacturing tolerances will not cause a substantial deterioration of the overall lens performance.

Condition 9 sets forth the requirement that has to be satisfied by the second lens group 2. The lens configuration of this second lens group is substantially the same as that employed in the prior art system of the two-group type. However, in accordance with the present invention, the negative lens element 23 in the second lens group 2 is made of an optical material having a high refractive index, which enables the field curvatuve at the wide angle position to be compensated in an effective fashion. If the lower limit of condition 9 is not reached, excessive sagittal astigmatism will readily occur in the peripheral region at the wide angle position.

In the lens system proposed in Japanese Patent Application No. 268473/1985, which is capable of achieving a zoom ratio exceeding 1.7, the second lens group has a three-unit three-element configuration composed of, in order from the object side, one positive meniscus lens element having a convex surface with a large curvature on the image side and two negative meniscus lens elements having a concave surface with large curvature on the object side. In accordance with the present invention, at least one aspheric surface is employed in the second lens group so as to render it in a simpler two-unit two-element configuration which is composed of in order from the object side, a positive meniscus lens element having a convex surface with a large curvature on the image side and a negative meniscus lens element having a concave surface with a large curvature on the object side. In spite of this simple lens configurations, the zoom lens system of the present invention achieves a performance that is comparable to that of the system described in Japanese Patent Application No. 268473/1985.

EXAMPLES

Two examples of a zoom lens system of the present invention are hereunder described in terms of numerical data tables. In these tables, $F_{NO}$ signifies the F number, f is the focal length, Z is the zoom ratio, ω is the half viewing angle, $f_B$ is the back focus, r is the radius of curvature of an individual lens surface, d is the thickness of an individual lens or the aerial distance of adjacent lens surfaces, N is the refractive index at the d line of an individual lens, and ν is the Abbe number of an individual lens element.

Example 1

$F_{NO}$ = 1:3.6–5.0–6.8   f = 36.00-50.00-68.00   Z = 1.89
ω = 30.6-23.4-17.8   $f_B$ = 11.00-25.59-43.66

| Surface No. | r | d | N | ν |
|---|---|---|---|---|
| 1 | 29.750 | 1.74 | 1.74400 | 44.7 |
| 2 | 62.544 | 2.36 | | |
| 3 | −21.448 | 1.30 | 1.83481 | 42.7 |
| 4 | −44.072 | 0.42 | | |
| 5 | −22.555 | 5.77 | 1.77250 | 49.6 |
| 6 | −20.680 | 2.40 | | |
| 7 | 25.825 | 3.99 | 1.51742 | 52.4 |
| 8 | −11.078 | 2.50 | 1.80518 | 25.4 |
| 9 | −19.581 | 12.21-7.16-3.72 | | |
| 10 | −40.170* | 3.63 | 1.80518 | 25.4 |
| 11 | −19.365 | 3.22 | | |
| 12 | −11.042 | 1.20 | 1.88300 | 40.8 |
| 13 | −58.260 | | | |

$f_s/f_1$ = 1.427   $N_{1an}$ = 1.835   $ν_{1an}$ = 42.7
$f_s/f_{1bn}$ = −0.987   $ν_{1bp} − ν_{1bn}$ = 27.0
$f_{BS}/f_s$ = 0.306   $r_6/f_s$ = −0.574
$f_s/f_{1am}$ = 0.090   $N_{2n}$ = 1.883

*The 10th surface is aspherical as expressed by the following equation:

$$X = \frac{Cy^2}{1 + \sqrt{1 - (1+k)C^2y^2}} + a_4y^4 + a_6y^6 + a_8y^8 + a_{10} + y^{10}$$

where $C = 1/r_{10}$
y = height from the optical axis.

The respective aspheric coefficients have the following values:

k = 0.0
$a_4 = 0.32394 \times 10^{-4}$
$a_6 = 0.19076 \times 10^{-6}$
$a_8 = 0.58840 \times 10^{-10}$
$a_{10} = 0.21226 \times 10^{-10}$

Example 2

$F_{NO}$ = 1:3.6–5.0–6.8   f = 36.10-50.00-68.00   Z = 1.88
ω = 31.4-23.7-17.9   $f_B$ = 13.00-27.70-46.74

| Surface No. | r | d | N | ν |
|---|---|---|---|---|
| 1 | 37.591 | 1.63 | 1.74400 | 44.7 |
| 2 | 100.449 | 1.56 | | |
| 3 | −21.079 | 1.30 | 1.83481 | 42.7 |
| 4 | −38.056 | 0.51 | | |
| 5 | −21.057 | 6.50 | 1.77250 | 49.6 |
| 6 | −21.354 | 2.21 | | |
| 7 | 25.315 | 4.26 | 1.51742 | 52.4 |
| 8 | −10.575 | 2.50 | 1.80518 | 25.4 |
| 9 | −18.319 | 11.57-6.92-3.72 | | |
| 10 | −41.652* | 0.50 | 1.54814 | 45.8 |
| 11 | −41.652 | 2.70 | 1.80518 | 25.4 |
| 12 | −18.804 | 2.86 | | |
| 13 | −10.710 | 1.20 | 1.88300 | 40.8 |
| 14 | −59.292 | | | |

$f_s/f_1$ = 1.511   $N_{1an}$ = 1.835   $ν_{1an}$ = 42.7
$f_s/f_{1bn}$ = −0.992   $ν_{1bp} − ν_{1bn}$ = 27.0   $f_{BS}/f_s$ = 0.36
$r_6/f_s$ = −0.592   $f_s/f_{1am}$ = 0.027   $N_{2n}$ = 1.883

*The 10th surface is aspherical as expressed by the following equation:

$$X = \frac{Cy^2}{1 + \sqrt{1 - (1+k)C^2y^2}} + a_4y^4 + a_6y^6 + a_8y^8 + a_{10} + y^{10}$$

where $C = 1/r_{10}$
y = height from the optical axis.

The respective aspheric coefficients have the following values:

k = 0.0
$a_4 = 0.52816 \times 10^{-4}$
$a_6 = 0.49555 \times 10^{-6}$
$a_8 = −0.30922 \times 10^{-8}$
$a_{10} = 0.62463 \times 10^{-10}$ In Example 2, the 10th surface is rendered aspherical by coating a very thin plastic film on the lens.

What is claimed is:

1. A zoom lens system for use with a compact camera, which comprises, in order from the object side, a first lens group having a positive focal length and a second lens group having a negative focal length and which achieves zooming between a wide angle position and a narrow angle position by changing the distance between the first and second lens groups, said first lens group comprising a front lens unit having a negative focal length comprising at least one positive lens element and at least one negative lens element, a rear lens unit having a positive focal length positioned on the image side of said first lens group and which comprises at least one negative lens element and at least one positive lens element, and a middle lens unit positioned between said front and rear lens units and which comprises at least one positive lens element having a convex surface directed toward the image side, said lens system satisfying the following conditions:

(1) $1.35 < f_s/f_1 < 1.7$;
(2) $1.69 < N_{1an}$;
(3) $34 < ν_{1an}$;
(4) $−2.0 < f_s/f_{1bn} < −0.7$;
(5) $9 < ν_{1bp} − ν_{1bn}$;
(6) $0.23 < f_{BS}/f_s < 0.5$;
(7) $−1.5 < r_6/f_s < −0.4$; and
(8) $−0.2 < f_s/f_{1am} < 0.2$ where
$f_s$: focal length of the overall lens system at the wide angle position;
$f_1$: focal length of said first lens group;
$N_{1an}$: refractive index at the d line of said negative lens element in said front lens unit;
$ν_{1an}$: Abbe number of said negative lens element in said front lens unit;
$f_{1bn}$: focal length of said negative lens element in said rear lens unit;
$ν_{1bp}$: Abbe number of said positive lens element in said rear lens unit;
$ν_{1bn}$: Abbe number of said negative lens element in the rear lens unit;
$f_{BS}$: back focus at the wide angle position;
$r_6$: radius of curvature of the surface on the image side of said middle lens unit; and
$f_{1am}$: composite focal length of the combination of said front to middle lens units;

said second lens group being of a two-unit two-element configuration comprising, in order from the object side, a positive meniscus lens element having a convex surface with a large curvature on the image side and a negative meniscus lens element having a concave surface with a large curvature on the object side, said second lens group having at least one aspheric surface and satisfying the following condition:

(9) $1.7 < N_{2n}$ where
$N_{2n}$: refractive index at the d line of said negative lens element in said second lens group.

2. The zoom lens system according to claim 1, wherein said first lens unit comprises, in order from the object side, a positive lens element having a convex surface with a large curvature on the object side and a negative lens element having a concave surface with a large curvature on the object side, said rear lens unit comprising, in order from the object side, biconvex positive lens element cemented to a negative meniscus lens element which has a concave surface directed toward the object side.

3. The zoom lens system according to claim 2, wherein asphericity is provided in the surface on the object side of said positive meniscus lens element in said second lens group.

4. The zoom lens system according to claim 1, wherein said aspheric surface in said second lens group is formed a thin film on a surface of a lens element of said second lens group.

5. The zoom lens system according to claim 4, wherein said aspheric surface is the surface on the object side of said positive meniscus lens element in said second lens group.

6. The zoom lens system according to claim 1, wherein asphericity is provided in the surface on the object side of said positive meniscus lens element in said second lens group.

* * * * *